US012337444B2

(12) United States Patent
Chen

(10) Patent No.: US 12,337,444 B2
(45) Date of Patent: Jun. 24, 2025

(54) IMPACT POWERED TORQUE WRENCH

(71) Applicant: JU HE INDUSTRY CO., LTD., Taichung (TW)

(72) Inventor: Ting-Yuan Chen, Taichung (TW)

(73) Assignee: JU HE INDUSTRY CO., LTD., Taichung (TW)

( * ) Notice: Subject to any disclaimer, the term of this patent is extended or adjusted under 35 U.S.C. 154(b) by 0 days.

(21) Appl. No.: 18/430,161

(22) Filed: Feb. 1, 2024

(65) Prior Publication Data

US 2024/0286254 A1 Aug. 29, 2024

(30) Foreign Application Priority Data

Feb. 23, 2023 (TW) ................................ 112201648

(51) Int. Cl.
*B25B 23/14* (2006.01)
*B25B 21/02* (2006.01)
*B25B 23/00* (2006.01)

(52) U.S. Cl.
CPC ........ *B25B 21/026* (2013.01); *B25B 23/0028* (2013.01); *B25B 23/1405* (2013.01); *B25B 23/141* (2013.01)

(58) Field of Classification Search
CPC ....... B25B 21/02; B25B 21/004; B25B 19/00; B25B 13/46
See application file for complete search history.

(56) References Cited

U.S. PATENT DOCUMENTS

| | | | | |
|---|---|---|---|---|
| 4,184,552 | A * | 1/1980 | Anderson | B25B 21/02 173/93.5 |
| 4,293,044 | A * | 10/1981 | Anderson | B25B 19/00 173/93.5 |
| RE33,711 | E * | 10/1991 | Ono | B25B 21/02 81/464 |
| 6,578,643 | B2 * | 6/2003 | Izumisawa | B25B 21/004 173/55 |
| 9,555,532 | B2 * | 1/2017 | Amend | B25D 11/04 |
| 9,636,808 | B2 * | 5/2017 | Ho | B25B 21/02 |
| 10,926,383 | B2 * | 2/2021 | Scott | B25B 13/465 |
| 11,338,413 | B2 * | 5/2022 | Zhao | B25B 21/00 |
| 2014/0157961 | A1 * | 6/2014 | Chen | B25B 21/02 81/464 |
| 2014/0326112 | A1 * | 11/2014 | Lai | B25B 21/004 81/464 |
| 2015/0165603 | A1 * | 6/2015 | Cheng | B25B 21/004 81/464 |
| 2018/0354117 | A1 * | 12/2018 | Wu | B25B 21/004 |

* cited by examiner

*Primary Examiner* — Gloria R Weeks
(74) *Attorney, Agent, or Firm* — Sinorica International Patent & Trademark

(57) ABSTRACT

An impact powered torque wrench has a force-applying rod. The force-applying rod is connected to a transmission rod. A transmission shaft is disposed in the transmission rod. Two ends of the transmission shaft are connected to a head unit and a drive unit, respectively. A trip unit and an adjustment unit are provided between the force-applying rod and the transmission rod. An impact unit is provided between the transmission shaft and the drive unit. The drive unit drives the transmission shaft by means of intermittent impact, which increases the output torque and has a higher level of operational safety.

3 Claims, 13 Drawing Sheets

IMPACT POWERED TORQUE WRENCH

FIELD OF THE INVENTION

The present invention relates to a power torque wrench that is driven by impact power in cooperation with manual operation.

BACKGROUND OF THE INVENTION

A conventional power torque wrench has a tubular body. A transmission shaft is rotatably provided in the tubular body. One end of the transmission shaft is connected to a head unit, and the other end of the transmission shaft is connected to a drive unit. The drive unit drives the transmission shaft, so that the transmission shaft drives the head unit to tighten or loosen a workpiece, such as a bolt.

However, the drive unit is directly connected to the transmission shaft by means of a reduction gear and a motor, that is, the power of the motor is directed to the transmission shaft by means of the reduction gear. Therefore, the output torque of the drive unit is small. If the user does not stop the drive unit immediately after tightening the workpiece, the reaction force will be transmitted back to the drive unit, which may cause the user to suffer from sprains easily.

SUMMARY OF THE INVENTION

The primary object of the present invention is to provide an impact powered torque wrench, which is driven by intermittent impact, can increase the output torque and prevent users from being injured, and has a higher level of operational safety.

In order to achieve the foregoing object, the impact powered torque wrench provided by the present invention has a force-applying rod. The force-applying rod is connected to a transmission rod. The transmission rod is swingable relative to the force-applying rod. A transmission shaft is rotatably disposed in the transmission rod. One end of the transmission shaft is connected to a drive unit for driving the transmission shaft to rotate and actuate. Another end of the transmission shaft is connected to a head unit. The head unit is driven by the transmission shaft to rotate relative to the force-applying rod. An impact unit is provided between the transmission shaft and the drive unit. The impact unit includes a driving member connected to the drive unit, an impact member driven by the driving member, and an output shaft connected to the transmission shaft. When the drive unit drives the driving member to rotate, the driving member drives the impact member to impact the output shaft intermittently, enabling the output shaft to rotate and drive the head unit to actuate. A trip unit is provided between the force-applying rod and the transmission rod. When the transmission rod is pulled by a user, an acting force is transmitted to the force-applying rod via the tripping unit; when the acting force reaches a torsion value, the trip unit trips.

When in use, the user first starts the drive unit to drive the transmission unit to rotate the head unit to tighten a workpiece in place quickly. Then, the drive unit is pulled, so that the acting force is transmitted to the force-applying rod via the trip unit and the workpiece is further tightened with a constant torque. Thus, the workpiece can be locked quickly and accurately with a constant torque. The drive unit uses intermittent impact to drive the transmission shaft, which can increase the output torque and prevent users from being injured, and has a higher level of operational safety.

DETAILED DESCRIPTION OF THE PREFERRED EMBODIMENTS

Embodiments of the present invention will now be described, by way of example only, with reference to the accompanying drawings.

Figure 1:
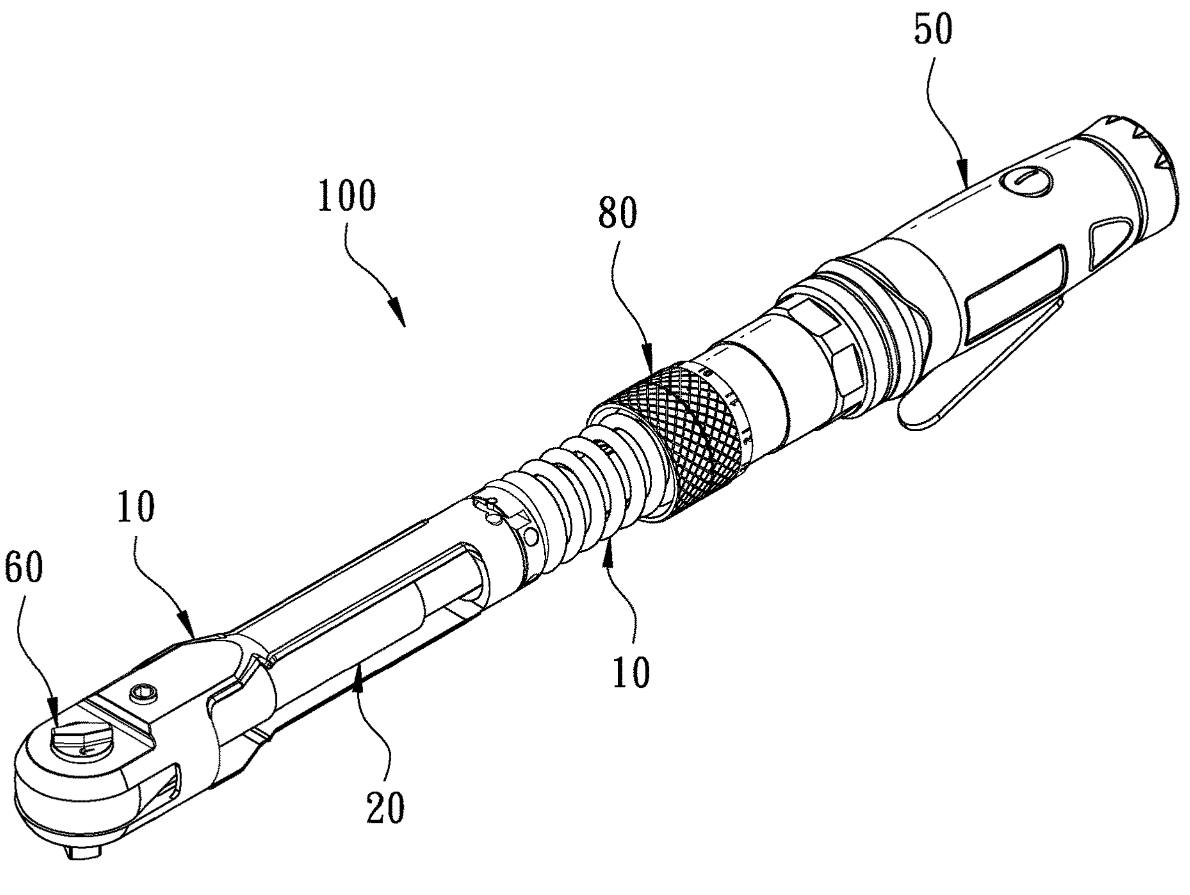
FIG. 1 is a perspective view in accordance with a first embodiment of the present invention.
Figure 2:
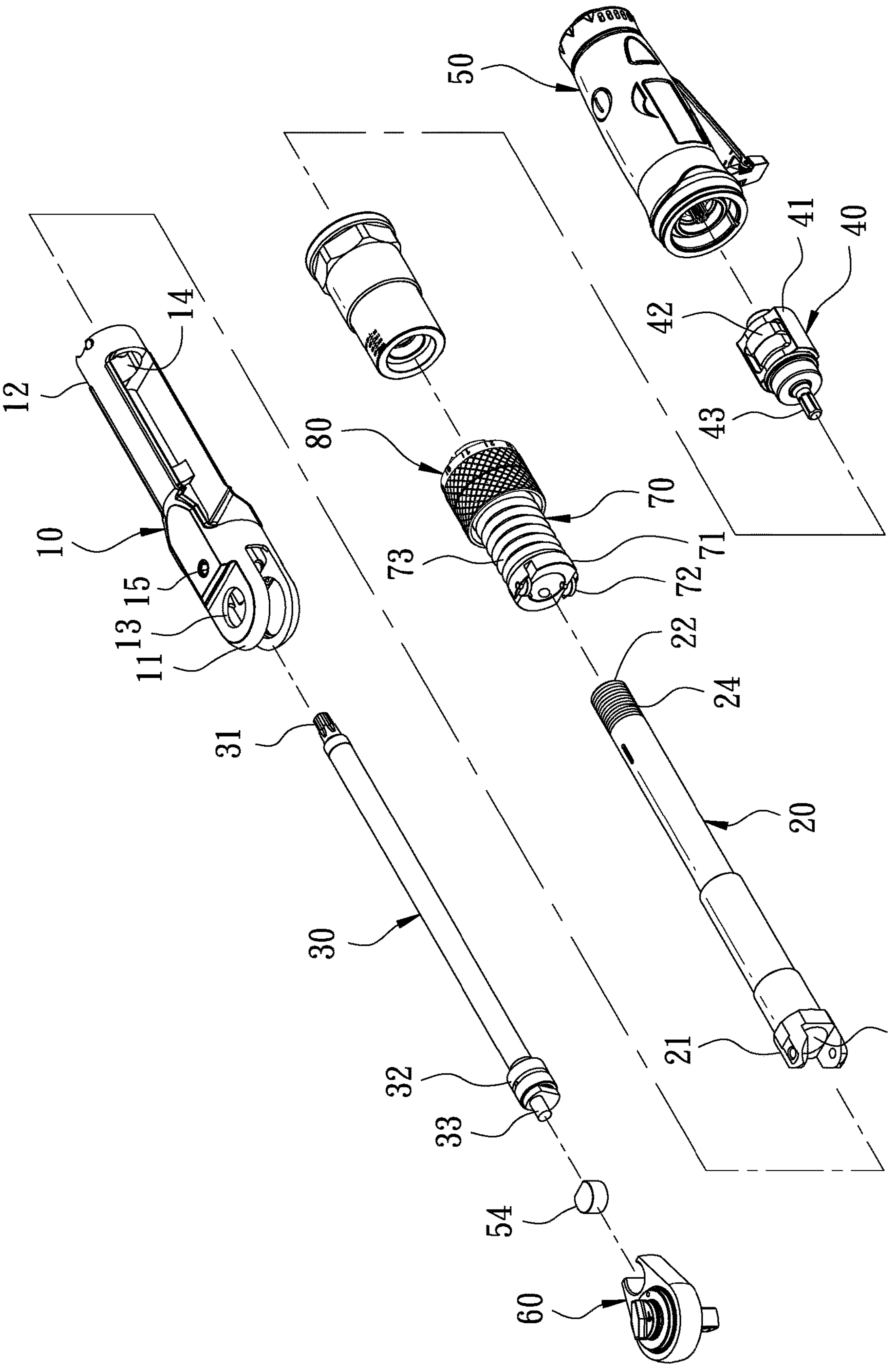
FIG. 2 is an exploded view in accordance with the first embodiment of the present invention.
Figure 3:
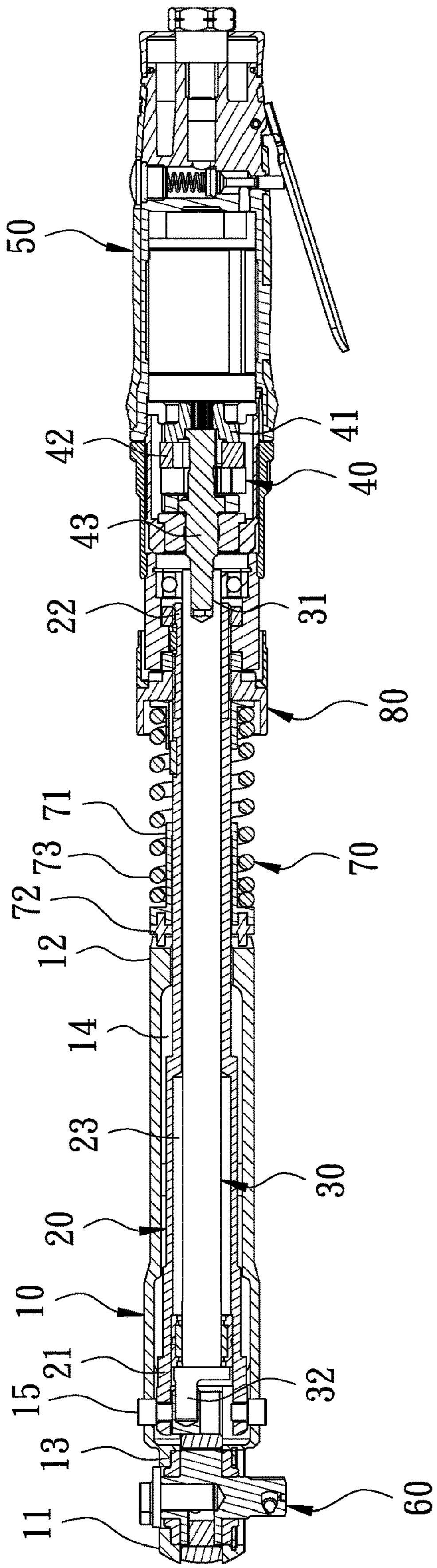
FIG. 3 is a cross-sectional view in accordance with the first embodiment of the present invention.

FIG. 1 is a perspective view in accordance with a first embodiment of the present invention. FIG. 2 is an exploded view in accordance with the first embodiment of the present invention. FIG. 3 is a cross-sectional view in accordance with the first embodiment of the present invention. The present invention discloses an impact powered torque wrench 100. The impact powered torque wrench 100 comprises a force-applying rod 10, a transmission rod 20, a transmission shaft 30, an impact unit 40, a drive unit 50, and a head unit 60.

The force-applying rod 10 has a front end 11 and a rear end 12 opposite to the front end 11. The front end 11 has a coupling hole 13. The rear end 12 has a perforation 14 communicating with the coupling hole 13. The force-applying rod 10 further has a pivot portion 15 close to the front end 11.

The transmission rod 20 is disposed along the axial direction of the force-applying rod 10. The transmission rod 20 has a first end 21, a second end 22 opposite to the first end 21, and a shaft hole 23 passing through the first end 21 and the second end 22. The first end 21 is inserted in the force-applying rod 10 from the perforation 14 and is pivotally connected to the pivot portion 15, so as to swing left and right relative to the force-applying rod 10.

The transmission shaft 30 is inserted in the shaft hole 23. The transmission shaft 30 has an input end 31 facing the second end 22 and an output end 32 facing the coupling hole 13.

The impact unit 40 is disposed at the second end 22 of the transmission rod 20 and is connected to the input end 31 of the transmission shaft 30.

The drive unit 50 is disposed at the second end 22 of the transmission rod 20 and connected to the impact unit 40. The drive unit 50 is an electric or pneumatic motor.

The head unit 60 is disposed in the coupling hole 13 and connected to the output end 32 of the transmission shaft 30. The head unit 60 is driven by the transmission shaft 30 to rotate relative to the force-applying rod 10.

The impact unit 40 includes a driving member 41 connected to the drive unit 50, an impact member 42 driven by the driving member 41, and an output shaft 43 connected to the transmission shaft 30. The impact member 42 and the output shaft 43 are not connected to each other. When the drive unit 50 drives the driving member 41, the driving member 41 will drive the impact member 42 to impact the output shaft 43 intermittently, enabling the output shaft 43 to rotate and drive the head unit 60 to actuate.

The impact powered torque wrench 100 further comprises a trip unit 70. The trip unit 70 is disposed between the force-applying rod 10 and the transmission rod 20. When the user pulls the transmission rod 20 by hand, the acting force will be transmitted to the force-applying rod 10 via the tripping unit 70. When the acting force reaches a torsion value, the trip unit 70 will trip so that the acting force will no longer be transmitted to the force-applying rod 10. In this embodiment, the trip unit 70 includes a slide sleeve 71 movable along the transmission rod 20, at least one trip member 72 between one side of the slide sleeve 71 and the force-applying rod 10, and a torsion spring 73 connected to the other side of the slide sleeve 71. The torsion spring 73 is elastically against the slide sleeve 71 to move toward the force-applying rod 10.

The impact powered torque wrench 100 further comprises an adjustment unit 80. The adjustment unit 80 is disposed on the transmission rod 20 and located between the drive unit 50 and the trip unit 70. The adjustment unit 80 is configured to adjust the torque value of the trip unit 70. In this embodiment, the transmission rod 20 has a threaded portion 24. The adjustment unit 80 is a nut threadedly connected to the threaded portion 24, and can be screwed to adjust the position along the transmission rod 20 to change the elastic force of the torsion spring 73.

When in use, the user holds the drive unit 50 by hand and starts the drive unit 50 to drive the impact unit 40, so that the impact unit 40 impacts the transmission shaft 30 intermittently and the transmission shaft 30 rotates the head unit 60, so as to tighten a workpiece in place quickly. Then, the drive unit 50 is pulled again, so that the acting force is transmitted to the force-applying rod 10 via the trip unit 70, and the workpiece is further tightened manually. When the acting force reaches the torque value, the trip unit 70 trips to interrupt the transmission of the force, so that the workpiece can be locked quickly and accurately with a constant torque.

Figure 4:
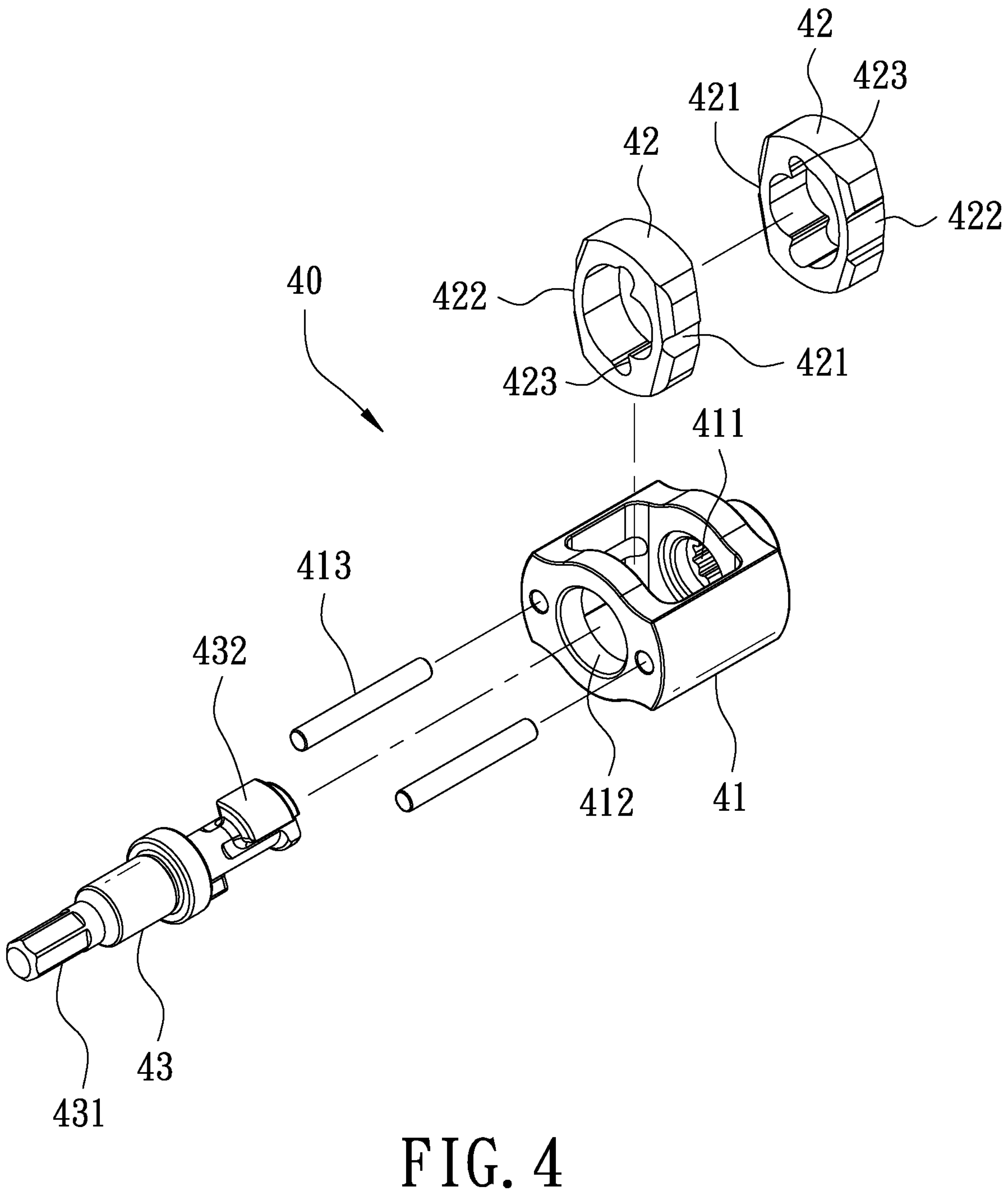
FIG. 4 is an exploded view of the impact unit in accordance with the first embodiment of the present invention.
Figure 5:
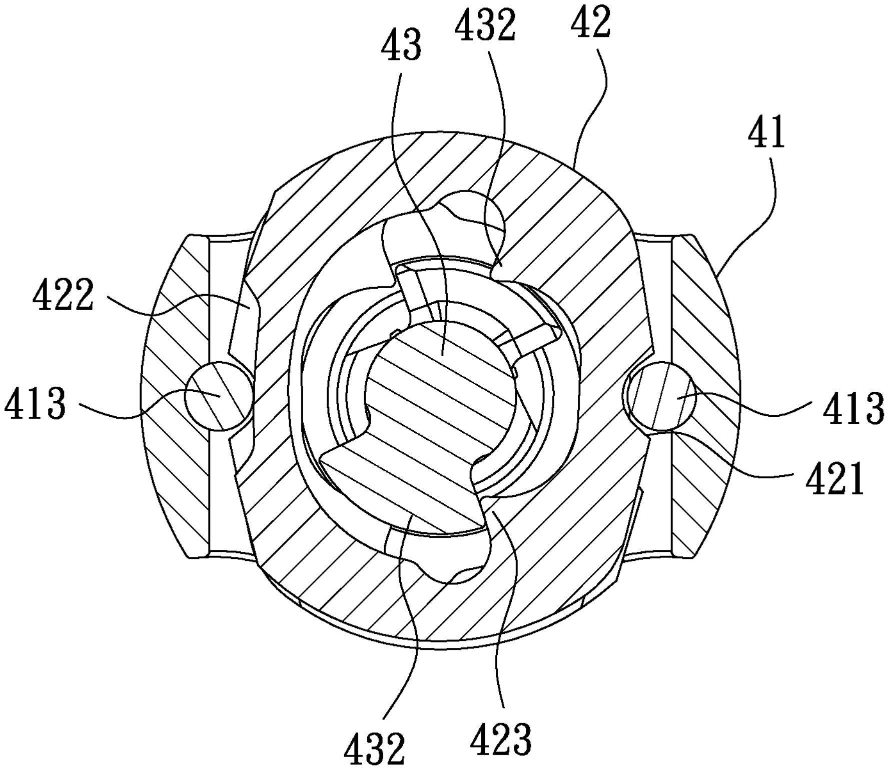
FIG. 5 is a cross-sectional view of the impact unit in accordance with the first embodiment of the present invention.

FIG. 4 is an exploded view of the impact unit in accordance with the first embodiment of the present invention. FIG. 5 is a cross-sectional view of the impact unit in accordance with the first embodiment of the present invention. The driving member 41 is in the form of a frame. One side of the driving member 41 has a connecting portion 411 for connecting to the drive unit 50. The other side of the driving member 41 has an axial hole 412. Two restricting pins 413 are symmetrically provided in the frame of the driving member 41. The impact member 42 is in the form of a frame and is located inside the driving member 41. One side of the impact member 42 has a pivot groove 421 corresponding to one of the restricting pins 413 and having a width equal to that of the corresponding restricting pin 413. At least one impact portion 423 is provided in the frame of the impact member 42. The output shaft 43 is rotatably disposed in the axial hole 412. One end of the output shaft 43 has a coupling portion 431 for coupling to the transmission shaft 30. The peripheral side of the output shaft 43 has an impact-receiving portion 432 corresponding to the impact portion 423. When the drive unit 50 drives the driving member 41 to rotate, the driving member 41 will drive the impact member 42 to swing in the driving member 41 for the impact portion 423 to impact the impact-receiving portion 432 intermittently, thereby rotating the output shaft 43 indirectly. This not only increases the output torque but also prevents the transmission of the reaction force to protect the user from sprains and provide a higher level of operational safety.

Figure 6:
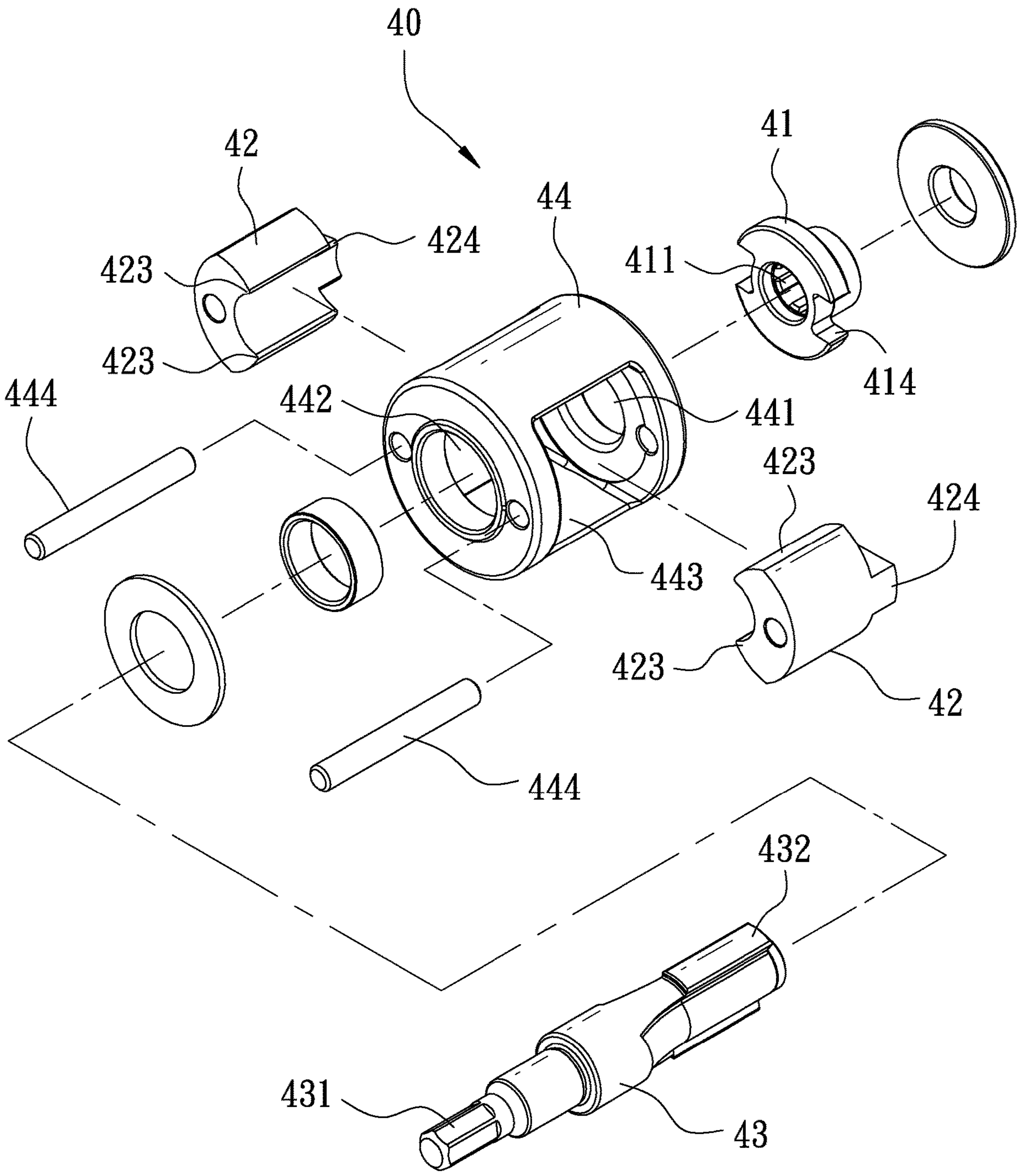
FIG. 6 is an exploded view of the impact unit in accordance with a second embodiment of the present invention.
Figure 7:
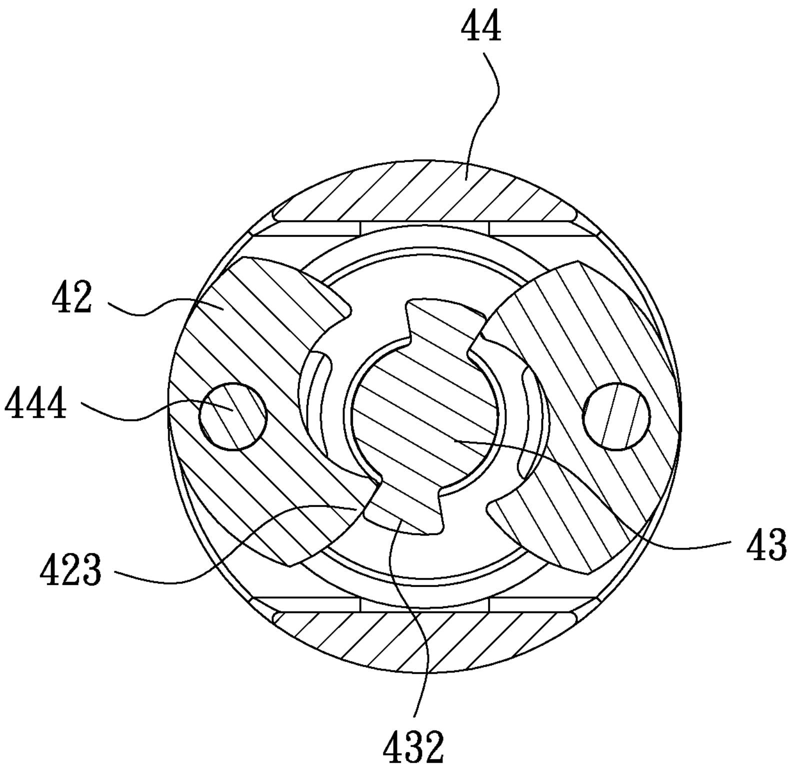
FIG. 7 is a cross-sectional view of the impact unit in accordance with the second embodiment of the present invention.

FIG. 6 is an exploded view of the impact unit in accordance with a second embodiment of the present invention. FIG. 7 is a cross-sectional view of the impact unit in accordance with the second embodiment of the present invention. The second embodiment is substantially similar to the first embodiment with the exceptions described below. The impact unit 40 has a rotating frame 44. One side of the rotating frame 44A is formed with a first through hole 441. The other side of the rotating frame 44 is coaxially formed with a second through hole 442. The peripheral side of the rotating frame 44 is formed with at least one accommodating hole 443. The driving member 41 is rotatably disposed in the first through hole 441. The driving member 41 has the connecting portion 411 for connecting to the drive unit 50. The peripheral side of the driving member 41 is formed with at least one notch 414. The impact member 42 is pivoted in the accommodating hole 443 through a central axis 444, and can swing in the accommodating hole 443 with the central axis 444 as the center. The impact portion 423 is disposed on either swing end of the impact member 42. The impact member 42 has a protrusion 424 corresponding to the notch 414. The protrusion 424 is inserted in the notch 414. The width of the protrusion 424 is less than the width of the notch 414. The output shaft 43 is rotatably disposed in the second through hole 442. One end of the output shaft 43 has the coupling portion 431 for coupling to the transmission shaft 30. The peripheral side of the output shaft 43 has the impact-receiving portion 432 corresponding to the impact portion 423. When the drive unit 50 drives the driving member 41 to rotate, the driving member 41 will drive the impact member 42 and the rotating frame 44 to rotate, and the impact member 42 will swing in the accommodating hole 443 for the impact portion 423 to impact the impact-receiving portion 432 intermittently, thereby rotating the output shaft 43 indirectly.

Figure 8:
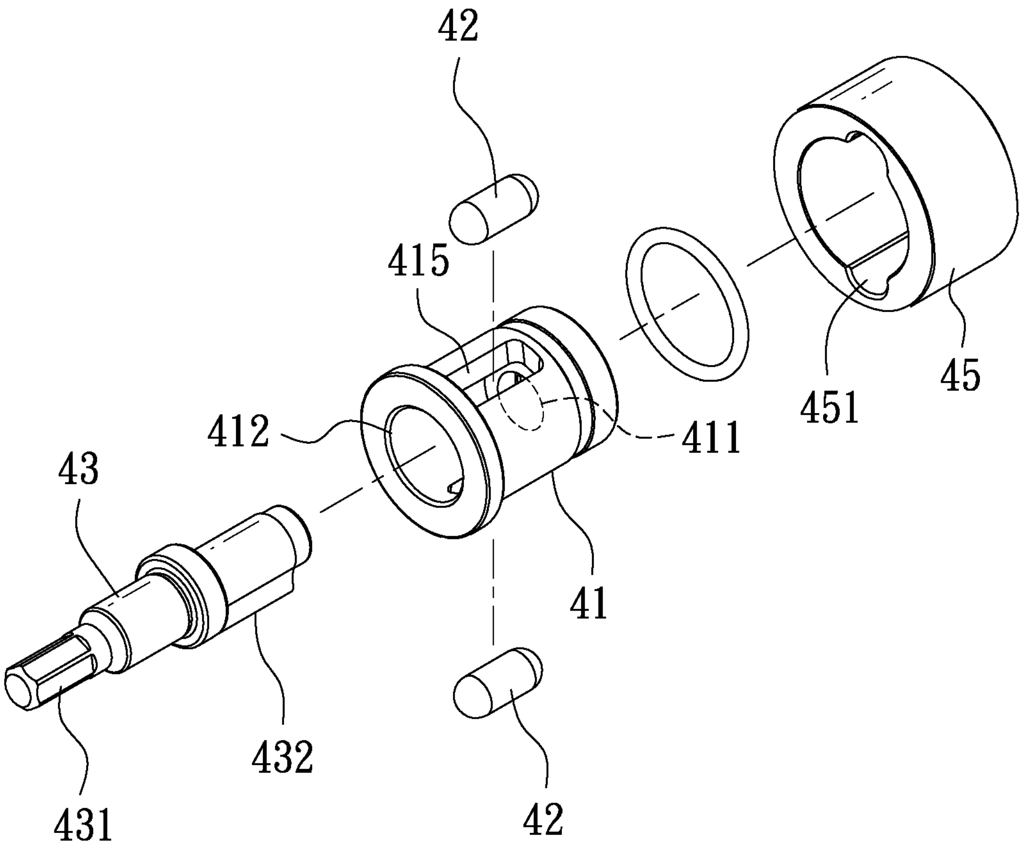
FIG. 8 is an exploded view of the impact unit in accordance with a third embodiment of the present invention.
Figure 9:
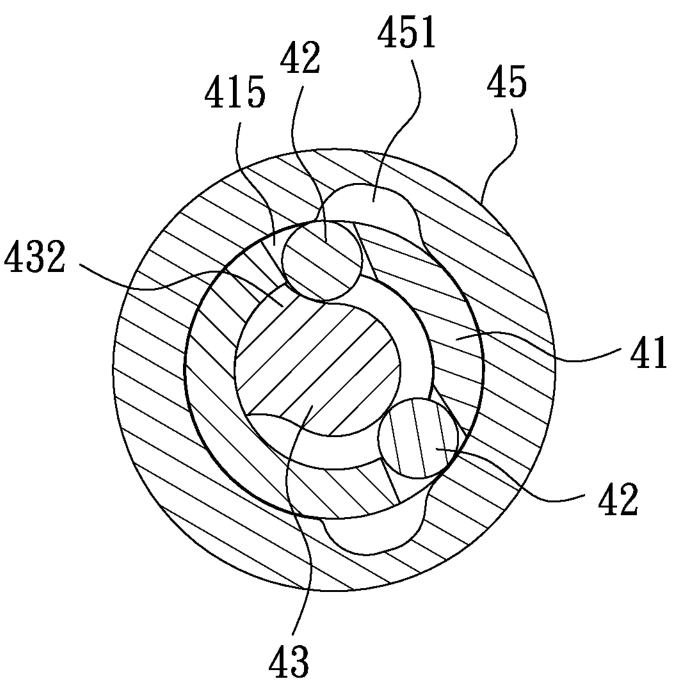
FIG. 9 is a cross-sectional view of the impact unit in accordance with the third embodiment of the present invention.

FIG. 8 is an exploded view of the impact unit in accordance with a third embodiment of the present invention. FIG. 9 is a cross-sectional view of the impact unit in accordance with the third embodiment of the present invention. The third embodiment is substantially similar to the first embodiment with the exceptions described below. The impact unit 40 has a retaining ring 45. The inner side of the retaining ring 45 is formed with at least one groove 451. The driving member 41 is in the form of a cylinder, and is rotatably disposed in the retaining ring 45. One side of the driving member 41 has the connecting portion 411 for connecting to the drive unit 50. The other side of the driving member 41 has the axial hole 412. The peripheral side of the driving member 41 is formed with a float hole 415 corresponding to the groove 451. The impact member 42 is in the form of a roller and is disposed in the float hole 415 in a floating manner. The output shaft 43 is rotatably disposed in the axial hole 412. One end of the output shaft 43 has the coupling portion 431 for coupling to the transmission shaft 30. The peripheral side of the output shaft 43 has the impact-receiving portion 432 corresponding to the impact portion 423. When the drive unit 50 drives the driving member 41 to rotate, the impact member 42 will be guided by the inner wall of the retaining ring 45 to retract into the float hole 415 and will come out from the float hole 415 when rotated to a position corresponding to the groove 451 for the impact member 42 to impact the impact-receiving portion 432 intermittently, thereby rotating the output shaft 43 indirectly.

Figure 10:
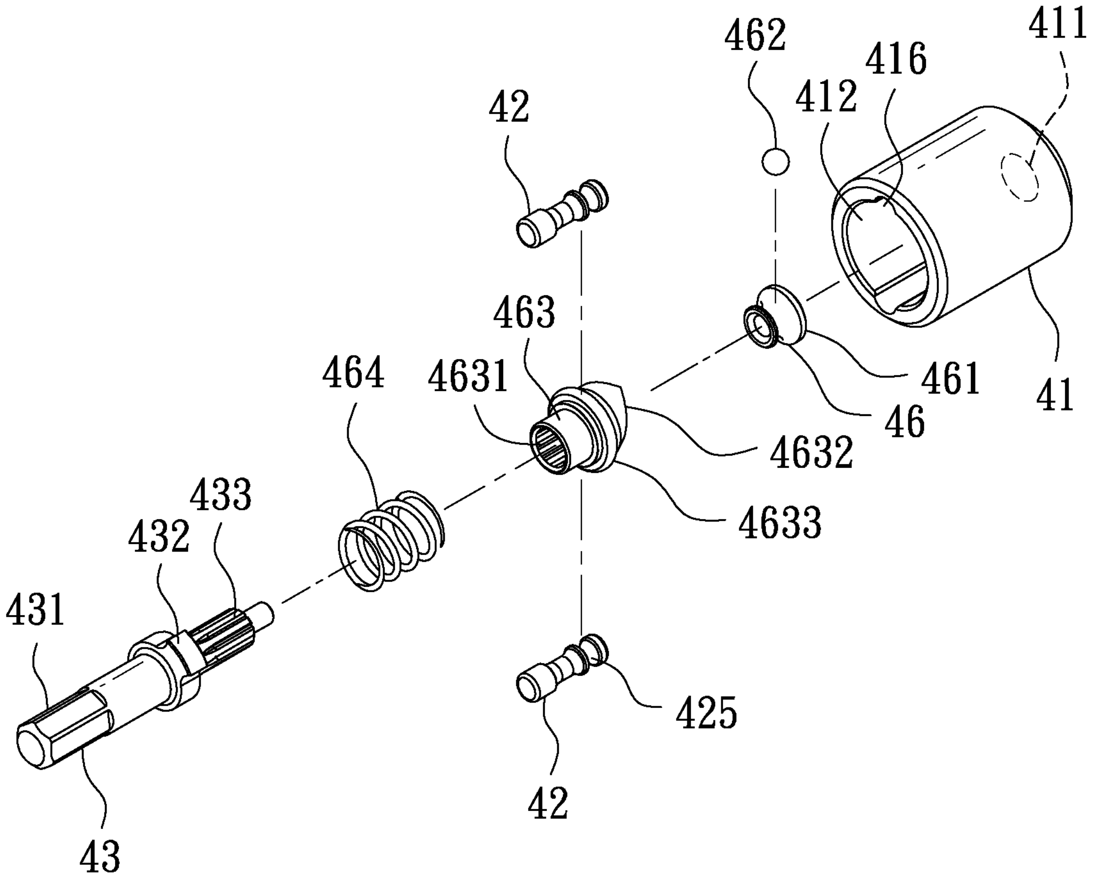
FIG. 10 is an exploded view of the impact unit in accordance with a fourth embodiment of the present invention.
Figure 11:
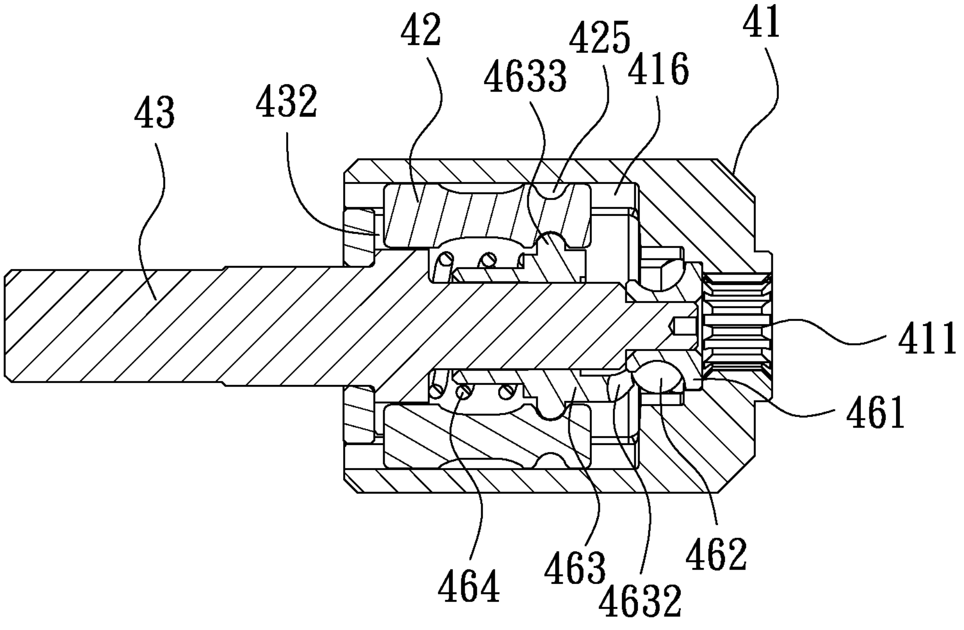
FIG. 11 is a cross-sectional view of the impact unit in accordance with the fourth embodiment of the present invention.

FIG. 10 is an exploded view of the impact unit in accordance with a fourth embodiment of the present invention. FIG. 11 is a cross-sectional view of the impact unit in accordance with the fourth embodiment of the present invention. The fourth embodiment is substantially similar to the first embodiment with the exceptions described below. The driving member 41 is in the form of a cylinder. The driving member 41 has the connecting portion 411 for connecting to the drive unit 50. The other side of the driving member 41 has the axial hole 412. The inner wall of the axial hole 412 is formed with at least one guide groove 416. The impact member 42 is slidably disposed in the guide groove 416. The peripheral side of the impact member 42 is formed with an annular groove 425. The output shaft 43 is rotatably disposed in the axial hole 412. One end of the output shaft 43 has the coupling portion 431 for coupling to the transmission shaft 30. The other end of the output shaft 43 has a first toothed portion 433. The peripheral side of the output shaft 43 has the impact-receiving portion 432 corresponding to the impact portion 423. In addition, the impact unit 40 further has a clutch structure 46. The clutch structure 46 includes a ball disk 461 on the connecting portion 411, a ball 462 on the ball disk 461, a sleeve 463 fitted on the output shaft 43, and an elastic member 464 between the sleeve 463 and the impact-receiving portion 432 of the output shaft 43. The inner side of the sleeve 463 has a second toothed portion 4631 corresponding to the first toothed portion 433, so that the sleeve 463 can only slide axially along the output shaft 43. The sleeve 463 has a slope portion 4632 corresponding to the ball 462. The peripheral side of the sleeve 463 has a flange 4633 corresponding to the annular groove 425 of the impact member 42. The flange 4633 is embedded into the annular groove 425 of the impact member 42. Thus, when the drive unit 50 drives the driving member 41 to rotate, the slope portion 4632 will be guided by the ball 462 for the sleeve 463 to move back and forth along the output shaft 43, and then the sleeve 463 will drive the impact member 42 to move back and forth along the guide groove 416 to intermittently pass through the side of the impact-receiving portion 432 for impacting the impact-receiving portion 432, thereby rotating the output shaft 43 indirectly.

Figure 12:
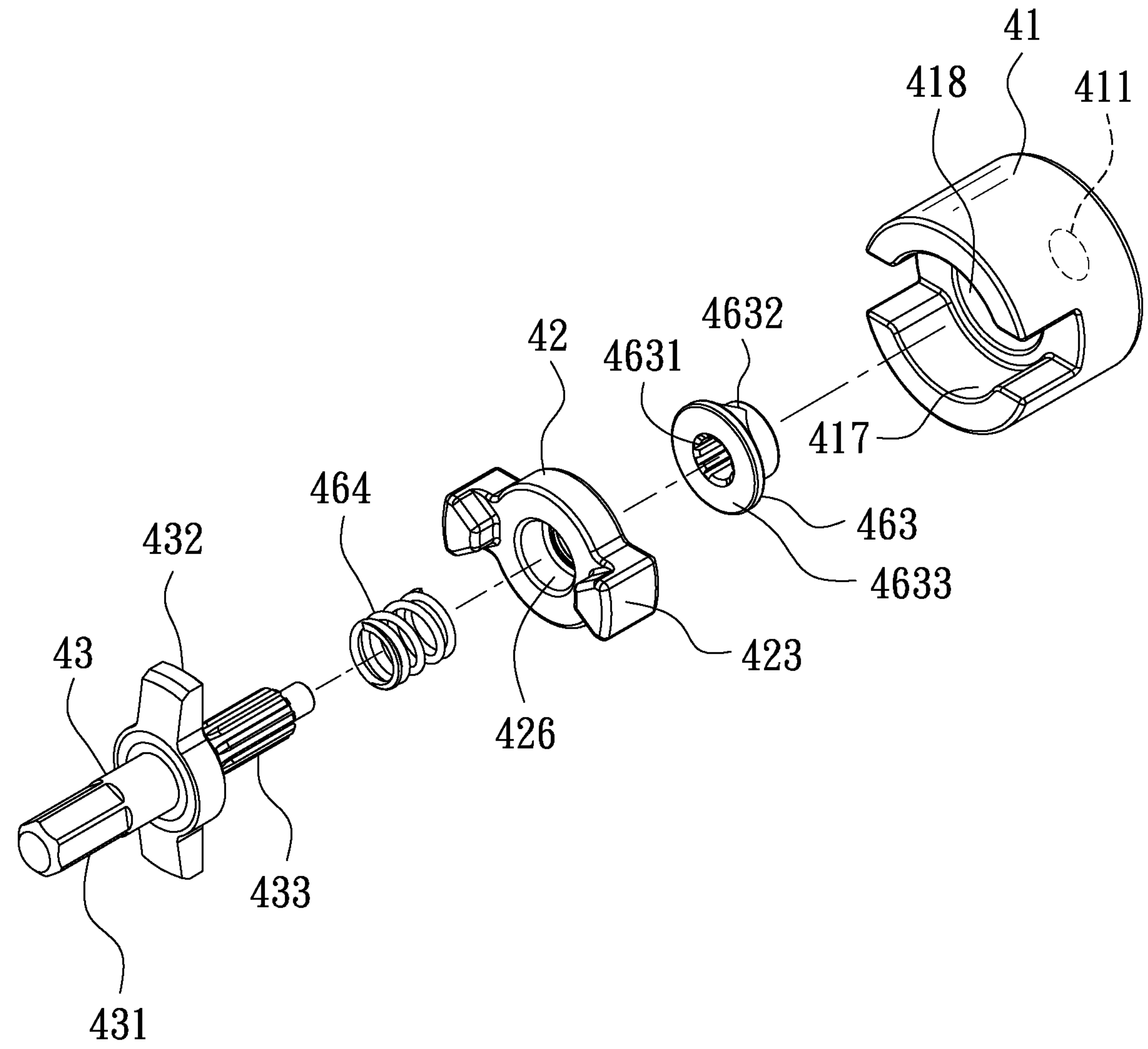
FIG. 12 is an exploded view of the impact unit in accordance with a fifth embodiment of the present invention.
Figure 13:
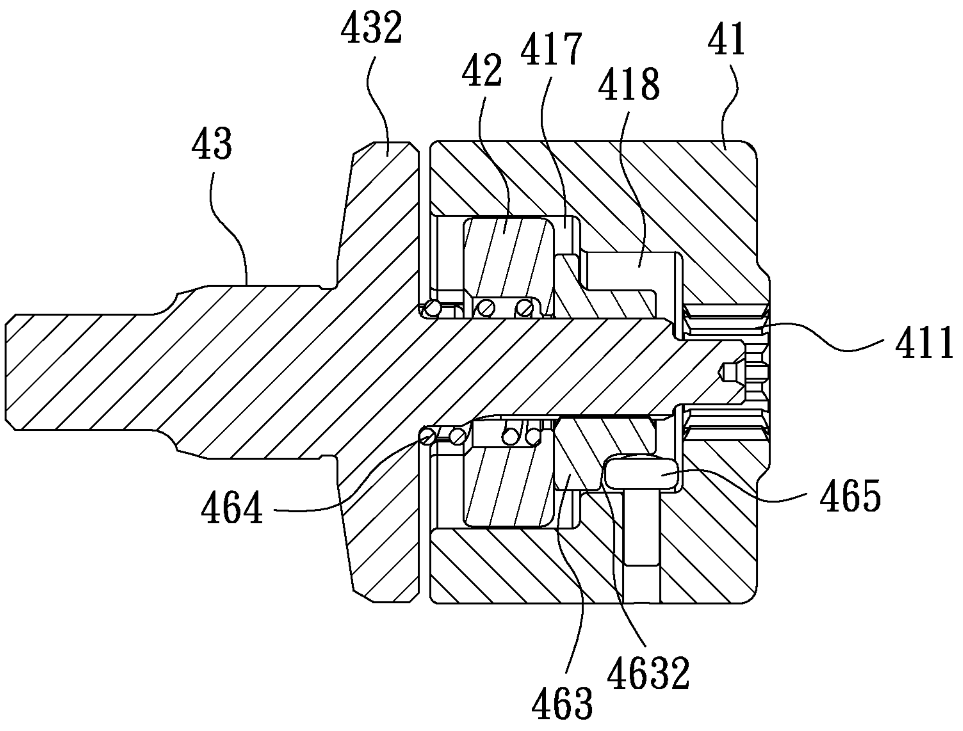
FIG. 13 is a cross-sectional view of the impact unit in accordance with the fifth embodiment of the present invention.

FIG. 12 is an exploded view of the impact unit in accordance with a fifth embodiment of the present invention. FIG. 13 is a cross-sectional view of the impact unit in accordance with the fifth embodiment of the present invention. The fifth embodiment is substantially similar to the first embodiment with the exceptions described below. One side of the driving member 41 has the connecting portion 411 for connecting to the drive unit 50. The other side of the driving member 41 has a restricting groove 417. An accommodating space 418 is defined between the bottom of the restricting groove 417 and the connecting portion 411. The impact member 42 is slidably disposed in the restricting groove 417. The impact member 42 has a central hole 426. At least one side of the impact member 42 has the impact portion 423. The output shaft 43 is rotatably disposed in the central hole 426. One end of the output shaft 43 has the coupling portion 431 for coupling to the transmission shaft 30. The other end of the output shaft 43 has a first toothed portion 433. The peripheral side of the output shaft 43 has the impact-receiving portion 432 corresponding to the impact portion 423. In addition, the impact unit 40 further has a clutch structure 46. The clutch structure 46 is substantially similar to the foregoing embodiment with the exception that a cam 465 is provided on the inner wall of the accommodating space 418, instead of the ball disk 461 and the ball 462. Thus, when the drive unit 50 drives the driving member 41 to rotate, the slope portion 4632 will be guided by the cam 465 for the sleeve 463 to move back and forth along the output shaft 43 to push the impact member 42 to move back and forth along the output shaft 43 for the impact portion 423 to intermittently pass through the side of the impact-receiving portion 432 to impact the impact-receiving portion 432, thereby rotating the output shaft 43 indirectly.

What is claimed is:

1. An impact powered torque wrench, comprising:
- a force-applying rod;
- a transmission rod, disposed along an axial direction of the force-applying rod, the transmission rod being swingable left and right relative to the force-applying rod;
- a transmission shaft, rotatably disposed in the transmission rod;
- an impact unit, connected to one end of the transmission shaft;
- a drive unit, connected to the impact unit;
- a head unit, connected to another end of the transmission shaft;
- a trip unit, disposed between the force-applying rod and the transmission rod, wherein when the transmission rod is pulled by a user, an acting force is transmitted to the force-applying rod via the tripping unit; when the acting force reaches a torsion value, the trip unit trips;
- wherein the impact unit includes a driving member connected to the drive unit, an impact member driven by the driving member, and an output shaft connected to the transmission shaft, the impact member and the output shaft are not connected to each other, when the drive unit drives the driving member to rotate, the driving member drives the impact member to impact the output shaft intermittently, enabling the output shaft to rotate and drive the head unit to actuate.

2. The impact powered torque wrench as claimed in claim 1, wherein the impact member has at least one impact portion, and a peripheral side of the output shaft has an impact-receiving portion corresponding to the impact portion and extending radially, when the drive unit drives the driving member to rotate, the impact portion impacts the impact-receiving portion intermittently, enabling the output shaft to rotate and drive the head unit to actuate.

3. The impact powered torque wrench as claimed in claim 2, wherein the driving member is in the form of a frame, one side of the driving member has a connecting portion for connecting to the drive unit, another side of the driving member has an axial hole, the impact member is in the form of a frame and is swingably disposed in the driving member, the impact portion is disposed in the impact member, the output shaft is rotatably disposed in the axial hole and passes through the impact member, one end of the output shaft has a coupling portion for coupling to the transmission shaft, and the peripheral side of the output shaft has the impact-receiving portion corresponding to the impact portion.

* * * * *